(12) United States Patent
Shammoh

(10) Patent No.: US 8,528,312 B1
(45) Date of Patent: Sep. 10, 2013

(54) TURBOJET ENGINE INLET AND EXHAUST COVERS

(71) Applicant: Ali A. A. J. Shammoh, Al-Adan (KW)

(72) Inventor: Ali A. A. J. Shammoh, Al-Adan (KW)

( * ) Notice: Subject to any disclaimer, the term of this patent is extended or adjusted under 35 U.S.C. 154(b) by 0 days.

(21) Appl. No.: 13/736,901

(22) Filed: Jan. 8, 2013

(51) Int. Cl.
*F02G 3/00* (2006.01)

(52) U.S. Cl.
USPC ........ 60/39.092; 60/226.1; 60/771; 60/39.35; 60/230; 415/121.2; 55/306

(58) Field of Classification Search
USPC ................ 60/39.092, 771, 226.1–226.3, 230, 60/39.35; 415/121.2; 55/306; 244/110 B; 239/265.29
See application file for complete search history.

(56) References Cited

U.S. PATENT DOCUMENTS

| | | | |
|---|---|---|---|
| 2,944,631 A * | 7/1960 | Kerry et al. | 55/306 |
| 3,646,980 A | 3/1972 | Peterson | |
| 3,976,160 A | 8/1976 | Hoch et al. | |
| 4,950,129 A * | 8/1990 | Patel et al. | 415/160 |
| 7,140,174 B2 * | 11/2006 | Johnson | 60/226.1 |
| 7,922,445 B1 * | 4/2011 | Pankey et al. | 415/160 |
| 8,052,767 B2 * | 11/2011 | Sands et al. | 55/306 |
| 2006/0107648 A1 | 5/2006 | Bulman et al. | |
| 2008/0210778 A1 | 9/2008 | Colosimo | |

* cited by examiner

*Primary Examiner* — Gerald L Sung
*Assistant Examiner* — Craig Kim
(74) *Attorney, Agent, or Firm* — Richard C. Litman

(57) ABSTRACT

The turbojet engine inlet and exhaust covers are permanently installed at the inlet and exhaust outlet or nozzle of an aircraft turbojet engine installation. The covers preclude the entrance of small animals, windblown debris, snow, and/or other contaminants into the engine inlet or exhaust while the airplane is inoperative. The covers have an iris-type shutter configuration, each cover having a plurality of leaves pivotally attached to a circumferential stationary housing that is attached to the engine or nacelle. A rotary ring is rotated through a small arc to pivot the shutter leaves inward and outward to close and open the engine opening. The rotary ring may be driven by an electric motor, or by hydraulic or pneumatic power. The system may be automated to close according to engine temperature after flight, and/or to open upon initiation of the engine start sequence for the aircraft.

13 Claims, 7 Drawing Sheets

TURBOJET ENGINE INLET AND EXHAUST COVERS

BACKGROUND OF THE INVENTION

1. Field of the Invention

The present invention relates generally to aeronautics, and particularly to turbojet engine inlet and exhaust covers that retract automatically upon engine start and deploy automatically upon engine shutdown. The covers serve to prevent the entry of foreign matter into the engine during inoperative periods.

2. Description of the Related Art

The typical turbojet engine provides a relatively large amount of power for its weight, which is why such engines are nearly universally installed on larger and/or faster airplanes. Such engines must ingest correspondingly large amounts of air to support the combustion that produces their thrust, which is delivered entirely in the form of high velocity exhaust gases. Accordingly, the inlets and exhaust nozzles of such engines are correspondingly large.

A common problem with aircraft that remain outdoors for any appreciable amount of time is the contamination of the aircraft by foreign matter entering virtually any available opening. In the spring, birds are well known to nest in virtually any opening or cavity available in an aircraft that is parked outdoors, and birds can build substantial nests in an amazingly short period of time. Nests have been found in open landing gear wells, tail cones, engine inlets, and jet exhaust nozzles in a vast array of different aircraft. Birds can be a particularly troublesome problem in aircraft engines, as their droppings are highly corrosive to many of the metals used in aircraft engines.

Insects are also well known to build nests in virtually any accessible area in an aircraft. Aside from nesting animals, windblown contamination in the form of dust, salt spray in maritime environments, snow, sand, leaves, and/or other debris, depending upon the weather, is commonly found in various openings of aircraft that remain outdoors for any appreciable time. It is of course essential that such foreign matter be removed from the aircraft prior to starting the engines with a degree of care that depends upon the nature of the contamination.

Various temporary turbojet engine inlet and exhaust covers have been developed in the past. These covers are formed of flexible material, such as sheet plastic, oil cloth, or canvas, and are secured to the engine inlet and/or exhaust by lacing or elastic bands. Some of these flexible and/or resilient inlet covers are configured to be compressed slightly to fit internally within the inlet so that their expansion secures them within the inlet. All such devices are removable, and are not permanently attached to the engine or to any part of the airframe.

Thus, turbojet engine inlet and exhaust covers solving the aforementioned problems are desired.

SUMMARY OF THE INVENTION

The turbojet engine inlet and exhaust covers are permanently installed at the engine inlet and exhaust nozzle or outlet of the turbojet engine, and serve to preclude entrance of small animals, debris, and/or other contaminants into the engine while the aircraft is inoperative. The turbojet engine inlet and exhaust covers are constructed similar to one another, with each of the covers comprising a circular housing that attaches immovably and permanently to the engine or to the nacelle surrounding the engine. The housing supports another ring concentric with the housing. The ring rotates through a small arc and drives an iris-type shutter therein. Rotation of the rotary ring in one direction results in the leaves or blades of the iris shutter moving from an open position (where they are substantially concealed within the housing) to pivot inward to a closed position to close off the engine inlet or exhaust. Reversal of the direction of rotation of the ring results in opening the iris shutter from a closed position. An inlet or exhaust fairing may be provided over the rotary ring.

The rotary ring is actuated by a reversible electric motor driving a pinion that engages a toothed sector of the rotary ring. Alternatively, a hydraulic or pneumatic motor may actuate the ring. Closure of the system may be automated to depend upon engine temperature, particularly in the case of the exhaust cover. The system may be further automated to open upon initiation of the engine start procedure, although manual actuation is preferably provided for preflight inspection and maintenance.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The turbojet engine inlet and exhaust covers comprise permanently installed assemblies for closing and sealing the air intake or inlet and exhaust outlet or nozzle of a turbojet engine to preclude the entrance of small animals, debris, and/or other contaminants into the engine. The covers are opened prior to starting the engine, and are closed after engine shutdown when temperatures (particularly exhaust) have reached a sufficiently low point. The opening and closing may be automated by a suitable system that provides for opening occurring as the start procedure is initiated and closing occurring according to engine temperature after shutdown.

Figure 1:
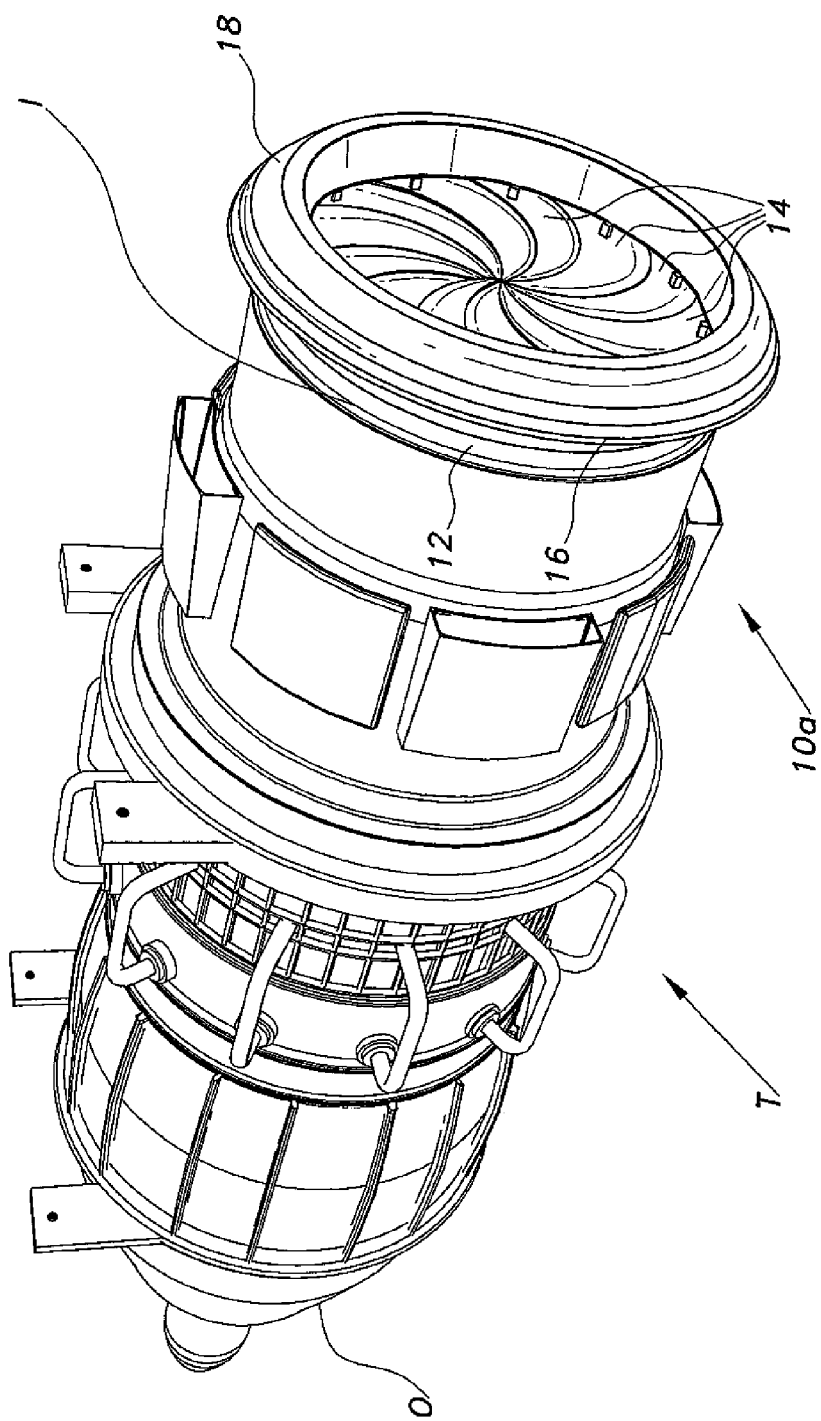
FIG. 1 is a perspective view of a turbojet engine incorporating turbojet engine inlet and exhaust covers according to the present invention as seen from the front, illustrating an engine inlet cover installed thereon.
Figure 2:
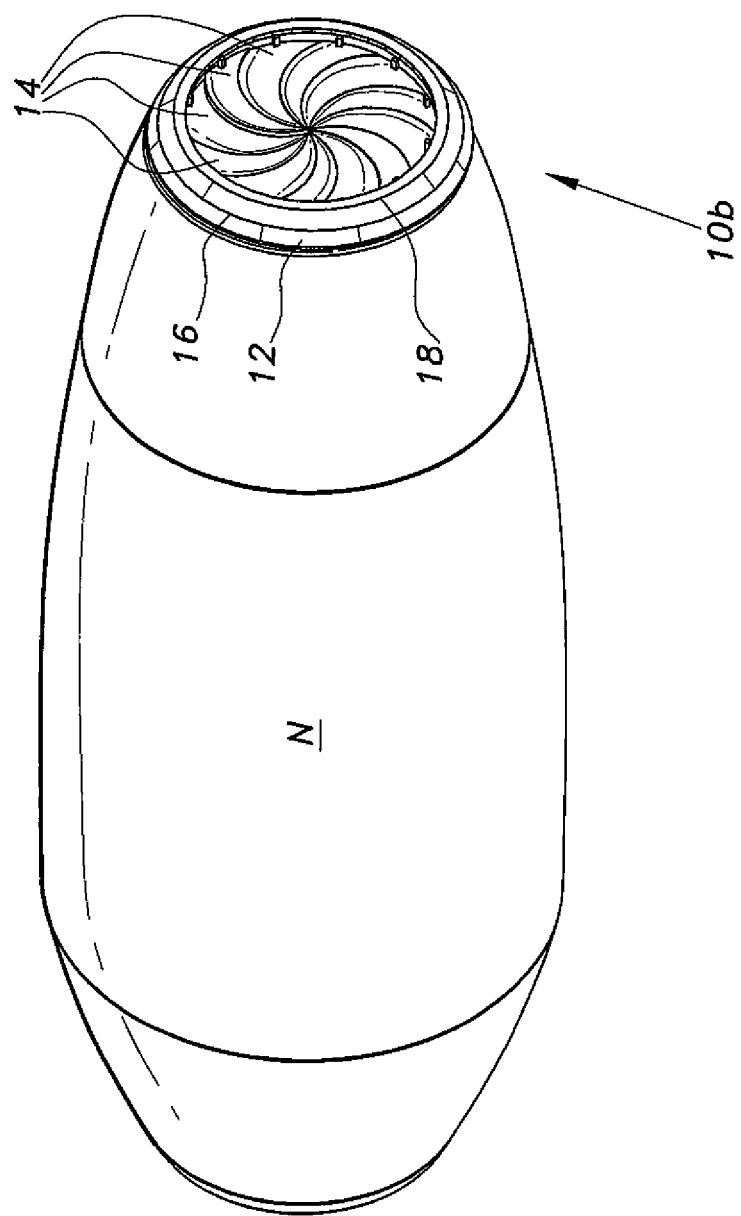
FIG. 2 is a perspective view of an engine nacelle having a turbojet engine exhaust cover according to the present invention installed over the exhaust end of the nacelle.
Figure 3A:
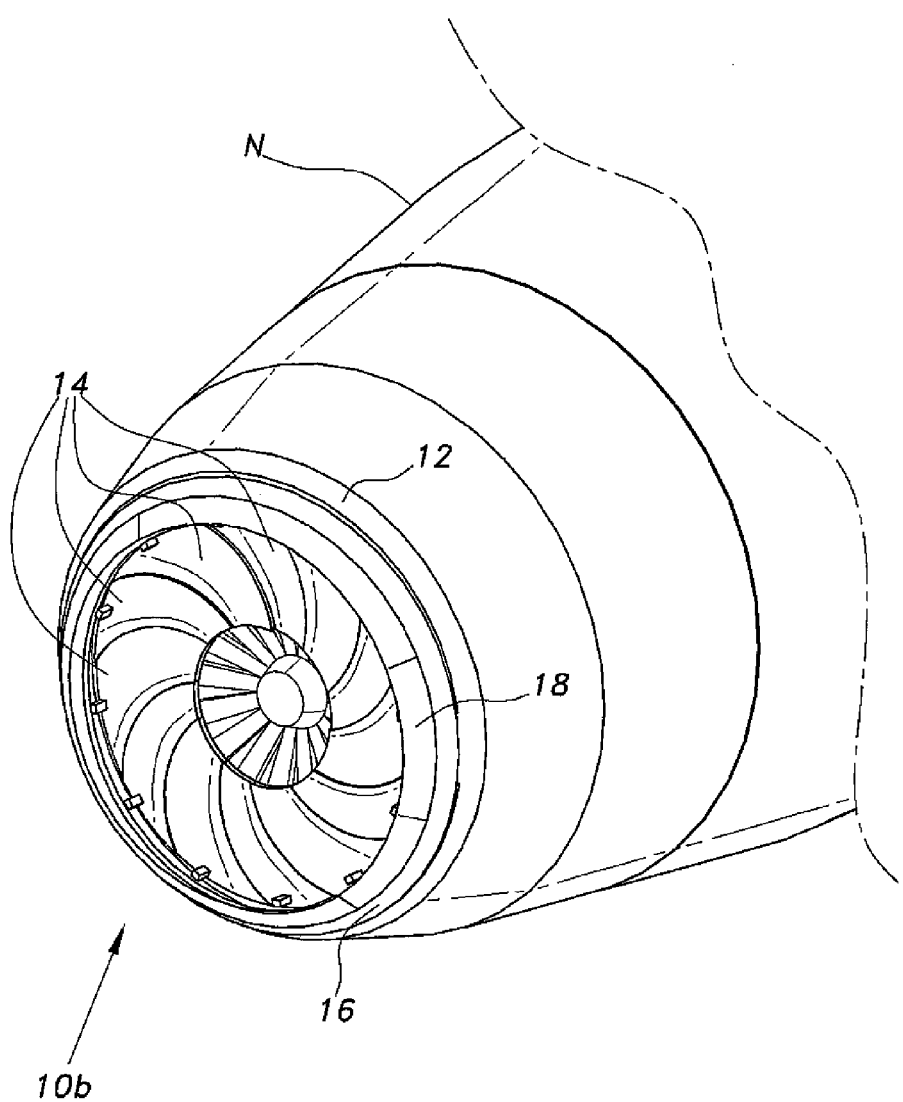
FIG. 3A is a partial perspective view of an engine nacelle having a turbojet engine exhaust cover according to the present invention installed over the exhaust end thereof, showing the iris actuation about one-third open from its fully closed position.
Figure 3B:
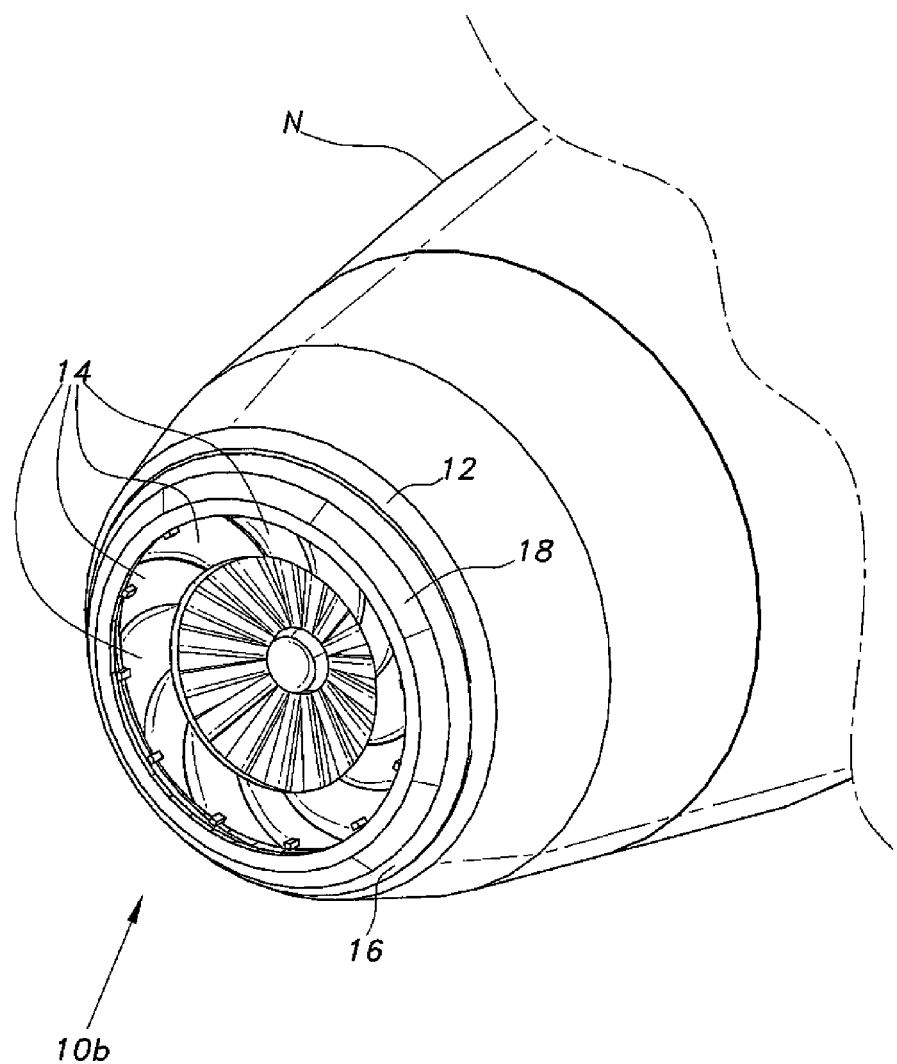
FIG. 3B is a partial perspective view of an engine nacelle having a turbojet engine exhaust cover according to the present invention installed over the exhaust end thereof, showing the iris actuation about two-thirds open from its fully closed position.
Figure 4:
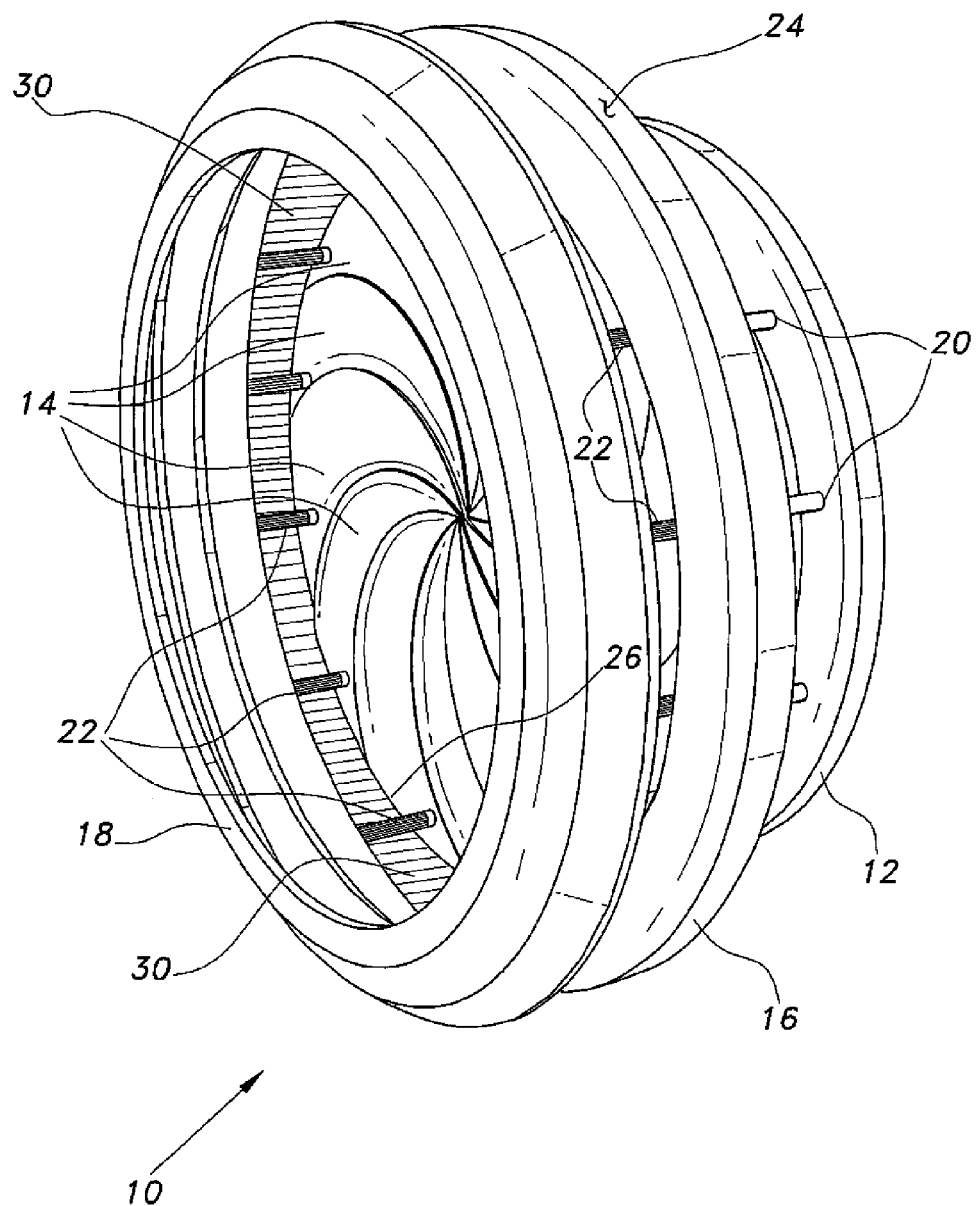
FIG. 4 is a perspective view of a turbojet engine inlet cover assembly according to the present invention, illustrating various details thereof.
Figure 5:
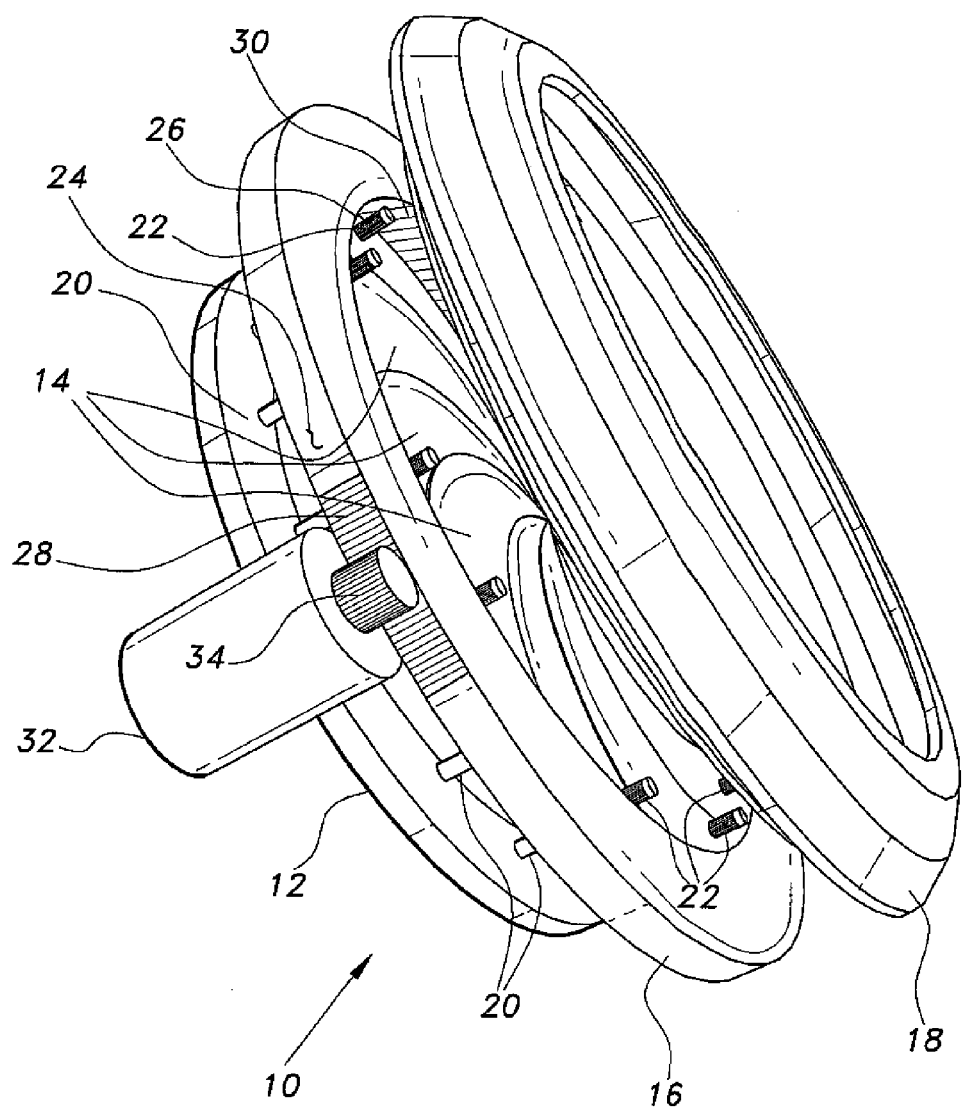
FIG. 5 is a front perspective view of a turbojet engine inlet cover assembly according to the present invention, illustrating the actuator motor and actuator ring thereof.

FIG. 1 of the drawings is a perspective view of an exemplary turbojet engine T incorporating the present intake or turbojet engine inlet cover 10a. The turbojet engine T includes a conventional intake or inlet I over which the intake cover 10a is secured, and an exhaust nozzle or outlet O. The present intake and exhaust covers are substantially identical in function, differing primarily in their sizes or diameters. A generic cover 10 is illustrated in FIGS. 4 and 5. FIG. 1 shows an inlet cover 10a, and FIGS. 2 through 3B illustrate an exhaust nozzle cover 10b installed over the engine exhaust. The intake or inlet cover 10a (and other covers 10 and 10b) generally includes a stationary circular housing 12 that affixes circumferentially and immovably to the engine inlet or exhaust, or to the inlet or outlet of a nacelle surrounding the engine. A plurality of shutter leaves 14 is pivotally attached to the housing 12. The leaves 14 are formed to mate along their mutually adjacent edges to seal the intake I (or exhaust, in the case of the cover 10b) when the cover is closed. The edges of the shutter leaves 14 slide relative to one another as they are opened or closed, in the manner of an iris-type shutter.

A rotary ring 16 is disposed concentric with the circular housing 12 so that the housing 12 is located between the engine inlet or outlet and the rotary ring 16, and the shutter leaves 14 are disposed in a plane between the housing 12 and rotary ring 16. The rotary ring 16 rotates through a small arc to pivot the shutter leaves 14 inward and outward to close and open the inlet or outlet of the engine, as described further below. An outer ring 18 is installed concentrically over the rotary ring 16. The rotary ring 16 and the shutter leaves 14 are captured between the housing 12 and outer ring 18. The housing 12 and outer ring 18 serve as anchors for the pivot pins of the shutter leaves 14, the leaves 14 pivoting therebetween.

FIGS. 2 through 3B illustrate the installation of a turbojet engine exhaust cover 10b upon the exhaust nozzle or outlet of a turbojet engine that has a conventional engine nacelle N installed over the engine. The engine within the nacelle N may have a conventional configuration similar to the turbojet engine T illustrated in FIG. 1 of the drawings.

It will be seen in FIG. 2 that the shutter leaves 14 are completely closed to seal the exhaust end of the engine and the outlet end of the nacelle N. FIG. 3A shows the shutter leaves 14 at an intermediate position, about one-third of the way open from their closed position of FIG. 2, the exhaust turbine blades of the engine being visible in the center of the partially open shutter. In FIG. 3B, the shutter leaves 14 have been opened further to about two-thirds of the way toward their fully open position, exposing the exhaust turbine more fully. The fully open position is not illustrated, as the shutter leaves 14 would be essentially concealed between the housing 12 and the outer ring 18 to allow engine exhaust to depart the engine without interference from the shutter. While FIGS. 2 through 3B illustrate a turbojet engine exhaust cover 10b, it will be seen that the various positions of the shutter leaves shown in FIGS. 3A and 3B are equally applicable to the turbojet engine intake cover 10a of FIG. 1, as the principle of operation between the two covers 10a and 10b is identical.

FIG. 4 illustrates further details of the shutter actuation mechanism. Each of the shutter leaves 14 is immovably affixed to a pivot pin 20 that is free to pivot in a socket or receptacle in the housing 12, the shutter leaves 14 pivoting therewith. The outer portions, i.e., the portions adjacent to and extending beyond the leaves 14 toward the outer ring 18, of these pivot pins 20 are toothed, and function as pinion gears 22. The distal ends of the pivot pins 20 beyond the pinion gear portions 22 are smooth and engage corresponding sockets or receptacles in the outer ring 18. The rotary ring 16 has an outer peripheral surface 24 and an inner peripheral surface 26. The outer surface 24 has an externally toothed segment 28 thereon (shown in FIG. 5), and the inner surface 26 has internal teeth 30 extending about its entire circumference. Thus, as the rotary ring 16 rotates through an arc between the housing 12 and the outer ring 18, and the pinion gears 22 of the pivot pins 20 rotate correspondingly to pivot the shutter leaves 14 inward and outward to close and open the covers accordingly.

The rotary ring 16 is rotated by a motor 32, shown in the exploded perspective view of FIG. 5. The motor 32 has an output shaft having a pinion drive gear 34 extending therefrom. The pinion drive gear 34 engages the external gear teeth 28 of the outer circumference 24 of the rotary ring 16 in order to rotate the rotary ring 16 through a small arc, thereby driving the pinion gears 22 and the shutter leaves 14 through engagement of the teeth on the inner surface 26 with the pinion gears 22 of the pivot pins 20.

Figure 6:
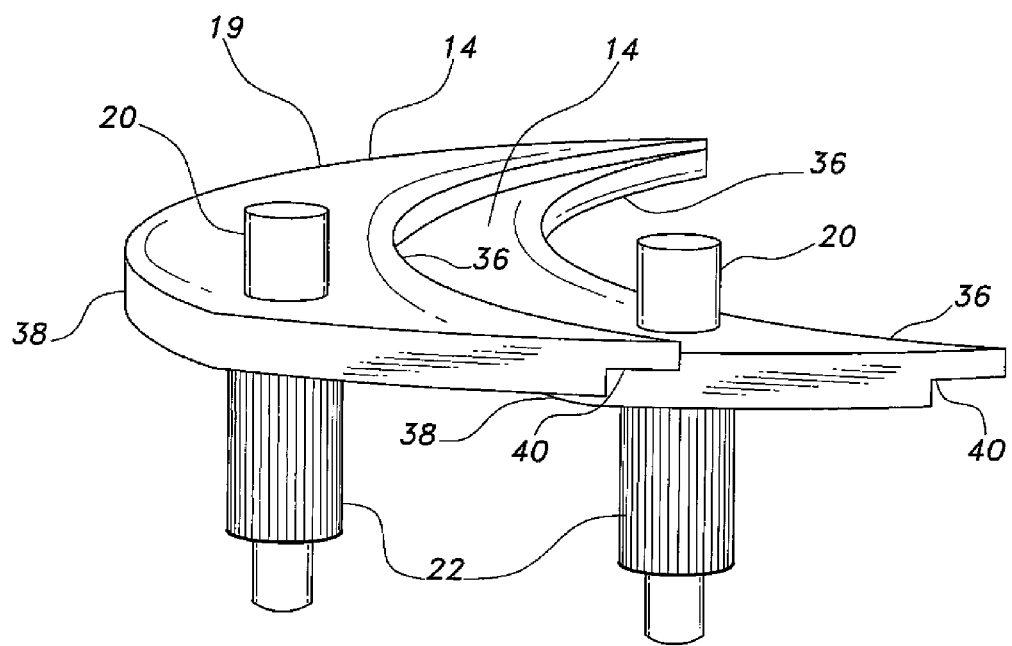
FIG. 6 is a detail perspective view of two of the iris shutter leaves or blades of turbojet engine inlet and outlet covers according to the present invention, showing details thereof.

FIG. 6 provides a perspective view of a pair of the shutter leaves 14, showing their overlapping edges. The pinion gear portion 22 of the pivot pins 20 would be oriented toward the housing 12 (not shown in FIG. 6), the pinion gear portions 22 engaging the rotary ring 16 (also not shown in FIG. 6). Each shutter leaf 14 has a leading edge 36 and opposite trailing edge 38. The leading edges 36 are oriented generally toward the center of the cover 10, and the trailing edges 38 are oriented toward the periphery of the cover 10. The leading edge 36 of each leaf 14 has a relief 40 formed therein. The relief 40 of each leaf 14 overlaps the trailing edge of the adjacent leaf 14. In this manner, a good seal is formed when the shutter leaves 14 are pivoted to their closed positions, as shown in FIGS. 1, 2, 4, and 5.

The operation of the turbojet engine inlet and exhaust covers 10 may be controlled manually using conventional mechanical, electrical, hydraulic, or pneumatic systems. However, the operation of the covers 10 is preferably carried out automatically by means of appropriate sensors (e.g., a temperature sensor in the exhaust system, a current of voltage sensor in the starting system, etc.) in the system. The covers 10 could be opened at some stage in the engine start procedure, or when the master electrical switch is closed. The reversal of this procedure could be used to close the intake cover 10a. Closure of the exhaust cover 10b could be delayed by suitable temperature sensors to allow the engine exhaust to cool to a predetermined point prior to closure. Manual overrides are desirable to allow personnel to perform preflight inspections and maintenance, and of course suitable safeguards would be provided to assure that the covers 10 cannot close inadvertently during engine operation.

It is to be understood that the present invention is not limited to the embodiments described above, but encompasses any and all embodiments within the scope of the following claims.

I claim:

1. A cover for a turbojet engine opening, comprising:
a circular housing adapted for permanent circumferential installation about an inlet or exhaust opening of a turbojet engine;
a selectively deployable and retractable shutter mechanism disposed adjacent the housing, the shutter mechanism selectively opening the engine opening when deployed and closing the engine opening when retracted; and
further comprising a rotary ring disposed concentric to the housing, the plurality of shutter leaves being pivotally disposed between the housing and the rotary ring, the rotary ring being linked to the shutter leaves so that rotation of the rotary ring relative to the housing pivots the shutter leaves inward and outward relative to the housing and rotary ring, and wherein the shutter leaves pivot in a circumferential direction.

2. The cover for a turbojet engine opening according to claim 1, wherein each of the shutter leaves has a leading edge and a trailing edge, the leading edge of each of the shutter leaves overlapping the trailing edge of the adjacent ones of the shutter leaves.

3. The cover for a turbojet engine opening according to claim 1, wherein the rotary ring has an outer peripheral surface and an inner peripheral surface, a plurality of gear teeth disposed in an arc upon the outer peripheral surface, and a plurality of gear teeth disposed about the inner peripheral surface of the rotary ring, the cover further comprising a pinion gear extending from each of the shutter leaves, each of the pinion gears engaging the gear teeth on the inner surface of the rotary ring.

4. The cover for a turbojet engine opening according to claim 3, further comprising:
a motor; and
a pinion drive gear extending from the motor, the pinion drive gear engaging the gear teeth on the outer peripheral surface of the rotary ring.

5. The cover for a turbojet engine opening according to claim 4, further comprising an outer ring disposed over the rotary ring, the pinion gears of the shutter leaves being captured between the housing and the outer ring.

6. A cover for a turbojet engine opening, comprising:
a stationary circular housing adapted for mounting over the turbojet engine opening;
a rotary ring disposed concentrically adjacent the housing; and
a plurality of shutter leaves pivotally disposed between the housing and the rotary ring;
wherein rotation of the rotary ring relative to the housing pivots the shutter leaves inward and outward relative to the housing and rotary ring, the shutter leaves closing the engine opening when pivoted inward and exposing the opening when pivoted outward, and wherein the shutter leaves pivot in a circumferential direction.

7. The cover for a turbojet engine opening according to claim 6, wherein each of the shutter leaves has a leading edge and a trailing edge, the leading edge of each of the shutter leaves overlapping the trailing edge of the adjacent ones of the shutter leaves.

8. The cover for a turbojet engine opening according to claim 6, wherein the rotary ring has an outer peripheral surface and an inner peripheral surface, a plurality of gear teeth disposed in an arc upon the outer peripheral surface, and a plurality of gear teeth disposed about the inner peripheral surface of the rotary ring, the cover further comprising a pinion gear extending from each of the shutter leaves, each of the pinion gears engaging the gear teeth on the inner surface of the rotary ring.

9. The cover for a turbojet engine opening according to claim 8, further comprising:
a motor; and
a pinion drive gear extending from the motor, the pinion drive gear engaging the gear teeth on the outer peripheral surface of the rotary ring.

10. The cover for a turbojet engine opening according to claim 9, further comprising an outer ring disposed over the rotary ring, the pinion gears of the shutter leaves being captured between the housing and the outer ring.

11. A turbojet engine, comprising: a jet engine having an inlet opening and an exhaust outlet opening;
at least one circular housing permanently installed about at least one of the openings of the jet engine;
an outer ring attached to the housing;
a rotary ring rotatable mounted between the housing and the outer ring, the rotary ring having:
an outer peripheral surface and a plurality of gear teeth disposed in an arc on the outer peripheral surface;
an inner peripheral surface and a plurality of gear teeth disposed about the inner peripheral surface;
a plurality of shutter leaves disposed between the rotary ring and the housing;
a plurality of pivot pins having a first end rotatably mounted in the housing, a second end rotatably mounted in the outer ring, and a central section between the first and second ends, the central section having a plurality of gear teeth defined therein engaging the gear teeth on the inner peripheral surface of the rotary ring, each of the shutter leaves being mounted on a corresponding one of the pivot pins;
a motor having a shaft and a pinion gear mounted on the shaft, the pinion gear engaging the gear teeth on the outer peripheral surface of the rotary ring;
wherein the motor is selectively actuable to rotate the rotary ring to pivot the shutter leaves between a closed position covering the jet engine opening and an open position exposing the jet engine opening, wherein the shutter leaves pivot in a circumferential direction, the closed position providing a barrier preventing moisture and contaminants from entering the engine when the engine is not in use.

12. The turbojet engine according to claim 11, wherein each of the shutter leaves has a leading edge and a trailing edge, the leading edge of each of the shutter leaves overlapping the trailing edge of the adjacent ones of the shutter leaves.

13. The turbojet engine according to claim 11, wherein said motor comprises an electric motor.

* * * * *